(12) United States Patent
Harshberger et al.

(10) Patent No.: US 7,736,117 B2
(45) Date of Patent: Jun. 15, 2010

(54) LINKAGE ASSEMBLY

(75) Inventors: Wayne Harshberger, Oswego, IL (US);
Darren M. Schambach, Braine-l'Allend (BE); Jason J. Hagedorn, Bloomingdale, IL (US); Paul D. Hagen, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 233 days.

(21) Appl. No.: 11/931,977

(22) Filed: Oct. 31, 2007

(65) Prior Publication Data

US 2009/0110530 A1 Apr. 30, 2009

(51) Int. Cl.
*B66C 23/00* (2006.01)

(52) U.S. Cl. .................. 414/686; 384/901; 403/288

(58) Field of Classification Search .......... 414/680, 414/686, 697, 700, 701; 384/901, 276, 295, 384/700, 701; 403/288
See application file for complete search history.

(56) References Cited

U.S. PATENT DOCUMENTS

| | | | |
|---|---|---|---|
| 2,828,984 A | 4/1958 | Chow | |
| 3,342,362 A | 9/1967 | Sergio Stefanutti | |
| 3,711,121 A | 1/1973 | Molby | |
| 4,096,957 A | 6/1978 | Iverson et al. | |
| 4,135,584 A | 1/1979 | Smith et al. | |
| 4,251,182 A | 2/1981 | Schroeder | |
| 4,772,150 A | 9/1988 | Horton | |
| 4,809,805 A | 3/1989 | Short | |
| 4,961,667 A | 10/1990 | Reinsma et al. | |
| 5,044,812 A | 9/1991 | Ardelt et al. | |
| 5,156,520 A | 10/1992 | Ericson et al. | |
| 5,183,318 A | 2/1993 | Taft et al. | |
| 5,184,932 A | 2/1993 | Misuda et al. | |
| 5,188,502 A | 2/1993 | Tonsor et al. | |
| 5,257,858 A | 11/1993 | Taft | |
| 5,535,533 A | 7/1996 | Romanchok | |
| 5,595,471 A | 1/1997 | Ajilore | |
| 5,599,158 A | 2/1997 | Ajilore | |
| 6,109,706 A | 8/2000 | Oertley | |
| 6,116,847 A | 9/2000 | Ginn et al. | |
| 6,382,742 B1 | 5/2002 | Hasselbusch et al. | |
| 6,409,459 B1 | 6/2002 | Ginn et al. | |
| 6,485,116 B1 | 11/2002 | Oertley | |
| 6,846,051 B2 * | 1/2005 | Bottom et al. | 305/202 |
| 7,309,186 B2 * | 12/2007 | Oertley | 403/288 |
| 2004/0228676 A1 | 11/2004 | Oertley | |
| 2006/0181149 A1 | 8/2006 | Oertley | |

FOREIGN PATENT DOCUMENTS

FR 1523548 5/1968
JP 02229327 9/1990

* cited by examiner

*Primary Examiner*—Donald Underwood
(74) *Attorney, Agent, or Firm*—Leydig, Voit & Mayer, Ltd

(57) ABSTRACT

A linkage assembly that includes a pivot pin cartridge disposed to connect pivotably a lift arm and a lever of the linkage assembly along an axis including the cartridge. The pivot pin cartridge includes a pin, at least one bushing pivotably disposed about at least a portion of the pin, and a pair of sleeve bearing inserts free-floatingly positioned about the pin and within at least a portion of the bushing. The rear tilt lever is coupled to the bushing for rotation about the pin, while at least one of a pair of side plates of the lift arm is coupled to the pivot pin.

20 Claims, 7 Drawing Sheets

LINKAGE ASSEMBLY

TECHNICAL FIELD

This patent disclosure relates generally to linkage assemblies for connecting an implement to a frame of a machine, and, more particularly, to such a linkage assembly that includes lift arm for connecting an implement to a frame of a machine.

BACKGROUND

Machines, such as wheel loaders, typically include a linkage assembly which mechanically connects an implement (e.g., a bucket) to a frame of the machine. Linkage assemblies, such as so-called "eight-bar linkages," will typically include a lift arm having one end connected to the frame and the opposite end coupled to the implement. Generally, the linkage assembly also includes a number of mechanical links and/or levers and hydraulic actuators coupled to the frame and the lift an such that the lift an and the implement can be moved relative to the frame.

During operation of the machine, the linkage assembly is subjected to various loads and forces, some of which may be severe. Therefore, it is critical that each component thereof has sufficient structure and connection to one another to provide the strength necessary to withstand these loads and forces. Linkage assemblies have traditionally been constructed to be relatively large and bulky in order to accommodate such loads and forces.

Lift arms of an eight-bar linkage assembly in such machines are generally of a so-called "box-boom" construction or a plate construction. Box-boom lift arms are formed of a plurality of metal plates disposed in a box arrangement with a generally rectangularly shaped traverse cross-section and a generally hollow interior. The arrangement of U.S. Pat. No. 6,409,459 to Ginn et al., which is assigned to the assignee of this disclosure, includes such a boom lift arm. A box-boom lift arm typically includes one or more openings to accommodate other components, such as links, levers, or hydraulic actuators, extending through the upper or lower plates of the box-boom. The arrangement of the '459 patent includes a rear tilt lever that extends through an opening in the box boom lift arm. The rear tilt lever is pivotably coupled to the boom lift arm such that the opposite ends of the rear tilt lever pivot about the pivot axis on the boom lift arm. One end of the rear tilt lever is coupled to the machine frame by a rear tilt link, and the other end of the rear tilt lever is coupled to a tilt actuator, which is further coupled to the implement by way of a front tilt lever. Actuation of the tilt actuator causes the tilting of the implement in either direction.

In contrast, a lift arm of a plate construction includes a pair of side plates that are secured together by stabilizing front and/or rear cross-members. Eight-bar linkages including lift arms of a plate construction typically include two complete sets of tilt components, that is, two rear tilt levers, two rear tilt links, two tilt actuators, and two front tilt levers. The separate sets of tilt components have the same general relationship to one another as those described with regard to the box boom arrangement above, but one set of tilt components is coupled to one of the side plates of the lift arm, while the other set of tilt components is coupled to the other of the side plates of the lift arm. In other words, the rear tilt levers are coupled at the first ends to the frame by respective rear tilt links. The opposite ends of the rear tilt levers are coupled to respective tilt actuators, which are in turn coupled to the implement, generally through respective front tilt levers. The intermediate portions of the rear tilt levers are pivotably coupled to the respective plates of the lift arm.

An operator, typically located in a cab on the machine, causes the linkage assembly to move through a range of motion to place the implement in desired positions. Unfortunately, the components of the linkage assembly tend to obstruct the view of an operator running the machine. A "box-boom" lift arm essentially blocks the view of at least the area opposite the boom from the operator inasmuch as it presents a moving, elongated box. While a boom having a plate construction may provide a somewhat enhanced view over a boom having a box construction, the stabilizing front and/or rear cross-members of a plate construction boom are themselves quite bulky and obtrusive in order to accommodate the forces and loads. Moreover, the pairs of rear tilt levers, tilt actuators, rear tilt links, and front tilt levers generally utilized with a lift arm of a plate construction likewise obscure the areas in front of and to the side of the plates of the lift arm. As a result, the components of linkage assemblies including a plate-construction lift arm likewise typically obstruct the view of the operator through and around the linkage assembly. Obstructions in an operator's view of the area in front of and to either side of the implement and around the linkage assembly can not only inhibit efficient and effective operation of the machine, but can also present safety concerns, particularly where the arrangement may present relatively large blind spots to the operator.

It is therefore desirable to provide a linkage assembly that provides an operator with an enhanced view of the area around and in front of an associated machine, while exhibiting the structural integrity necessary to withstand the loads and forces associated with use of such a machine. The present disclosure is directed to overcoming one or more of the problems set forth above.

BRIEF SUMMARY

The disclosure describes, in one aspect, a linkage assembly for connecting an implement to a frame of a machine. The linkage assembly comprises a lift arm, a rear tilt lever, and a pivot pin cartridge coupling the lift arm and the lever, lift arm and the lever being pivotable relative to one another about an axis defined by the cartridge. The lift arm has opposite ends adapted to be pivotably coupled to the frame and to the implement, and includes a pair of side plates generally spaced apart in a parallel relationship, each of the side plates having a bore therethrough. The rear tilt lever also has a bore therethrough. The pivot pin cartridge includes a pin, at least one bushing pivotably disposed about at least a portion of said pin, at least two sleeve bearings disposed about said pin and within at least a portion of said bushing, and first and second collars disposed about opposite ends of the pin. The pivot pin cartridge extends through the bores in the rear tilt lever and the plates. The rear tilt lever is coupled to the bushing for rotation therewith about the pin.

In another aspect, the disclosure describes a machine to which an implement may be connected, the machine comprising a frame and a linkage assembly coupled to the frame and adapted to be coupled to the implement. The linkage includes a lift arm including a machine end pivotably coupled to the frame and an implement end adapted to be pivotably coupled to the implement. The lift arm has a pair of side plates spaced apart in a substantially parallel relationship, the side plates each having a bore therethrough. The linkage also includes a rear tilt lever that has opposite ends adapted to be pivotably coupled to the frame and the implement, respectively. The rear tilt lever further includes a bore therethrough intermediate the opposite ends. The linkage also includes a pivot pin cartridge defining an axis, the pivot pin cartridge including a pin disposed along said axis and having opposite ends. The pivot pin cartridge further includes at least one bushing pivotably disposed about at least a portion of said pin, and at least two sleeve bearings disposed about said pin and within at least a portion of said bushing, and first and second collars disposed about opposite ends of the pin. The pivot pin cartridge extends through the bore of the rear tilt lever and through the bores of said plates, the lift arm and said rear tilt lever being relatively pivotable about said axis, the rear tilt lever assembly being coupled to the bushing for rotation therewith about the pin.

In another aspect, the disclosure describes a method of coupling an implement to a frame of a machine. The method comprising the steps of pivotably coupling machine ends of respective side plates of a lift arm to the frame, the side plates being spaced apart in a substantially parallel relationship, pivotably coupling implement ends of the respective side plates of the lift an to the implement, pivotably coupling a tilt actuator end of a rear tilt lever to the implement, pivotably coupling a link end of the rear tilt lever to the frame, coupling the rear tilt lever to the side plates for relative pivotable movement along an axis, the rear tilt lever being relatively pivotably coupled at a bore located intermediate said tilt actuator and lever ends, and the side plates being relatively pivotably coupled at bores intermediate said machine and implement ends. The step of pivotably coupling the rear tilt lever to the side plates includes the steps of providing a pivot pin, rotatably disposing a bushing on said pivot pin, disposing at least two sleeve bearings about said pivot pin and within at least a portion of said bushing to form a pivot pin cartridge, securing the bores of the side plates to opposite ends of the pivot pin, securing the bores of the rear tilt lever to said at least one bushing.

BRIEF DESCRIPTION OF THE DRAWING(S)

DETAILED DESCRIPTION

Figure 1:
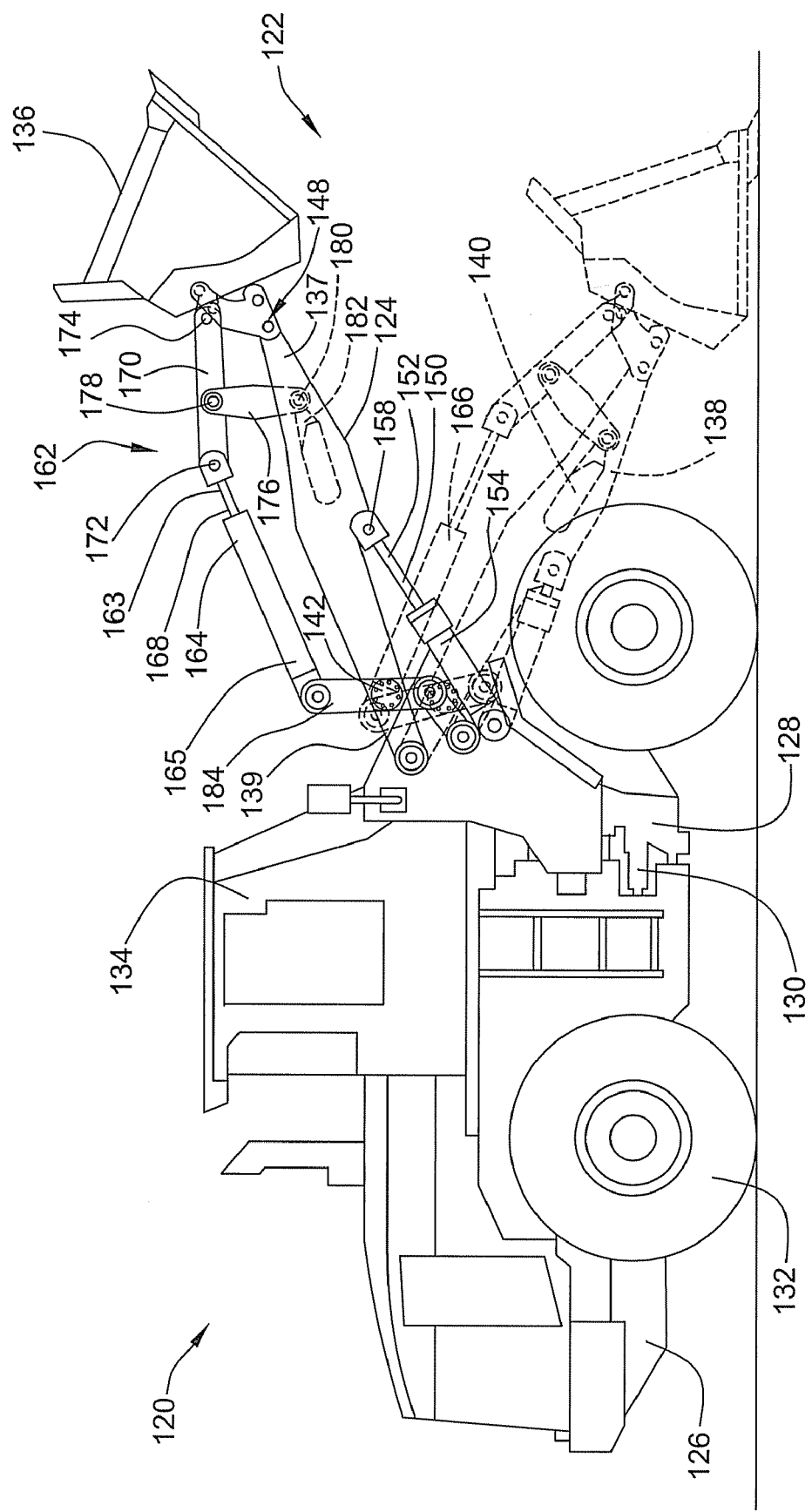
FIG. 1 is a schematic side elevational view of a machine incorporating a linkage assembly in accordance with this disclosure in lowered and elevated positions.
Figure 2:
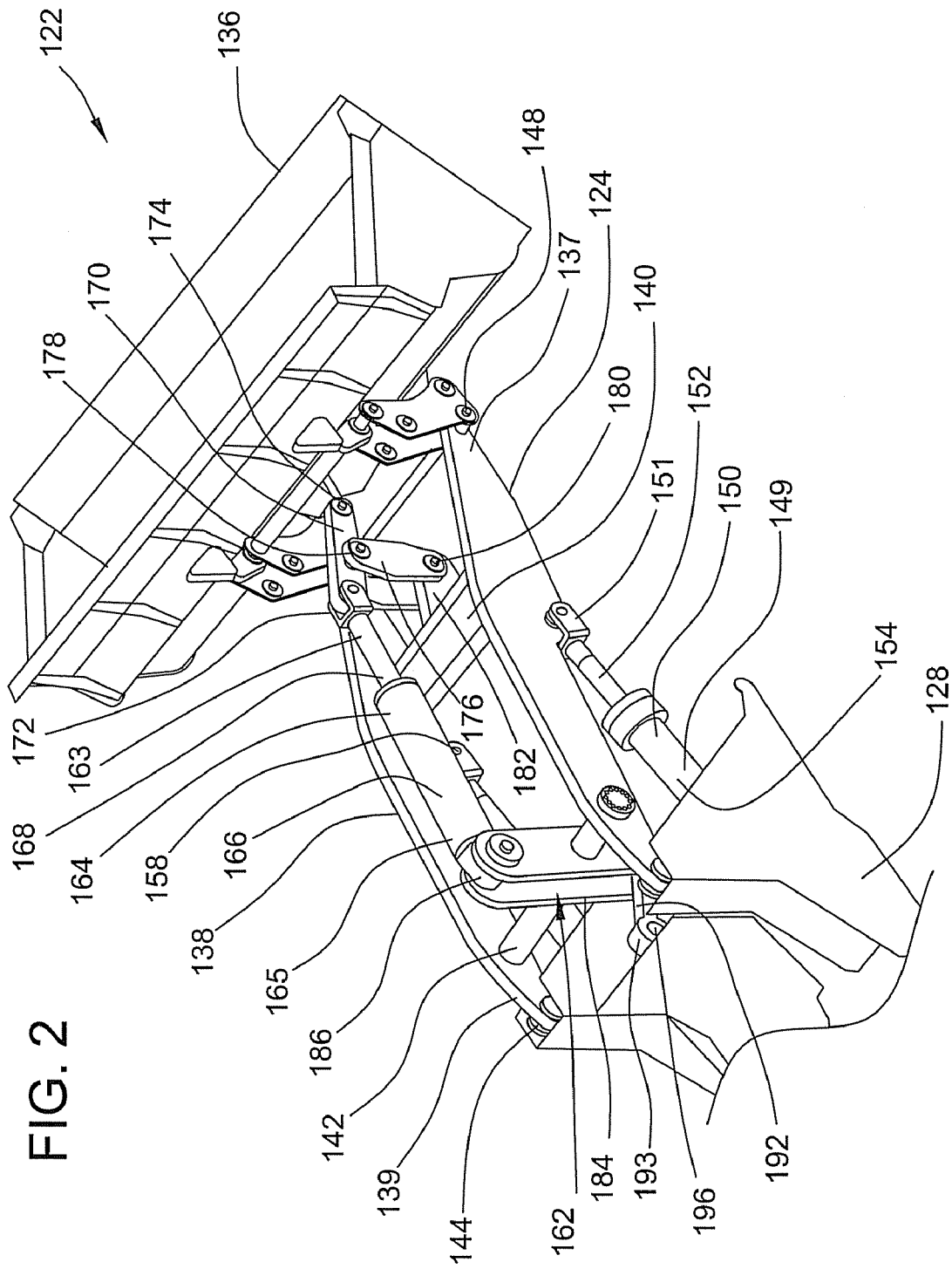
FIG. 2 is a fragmentary perspective view of the linkage assembly of FIG. 1.

This disclosure is directed to a machine and eight-bar linkage assembly supporting an implement, the linkage assembly providing an enhanced view of the area in front of and around the implement and the linkage assembly. FIGS. 1 and 2 show a representative machine 120 having an eight-bar linkage assembly 122 including a lift arm 124 of a plate construction. The illustration of FIG. 1 shows the linkage assembly 122 in a lifted position in solid lines, and in a lowered position in dotted lines. The illustrated machine 120 includes an engine end frame 126 and a non-engine end frame 128 connected at an articulation joint 130. The frame 126, 128 includes wheels 132 located on opposing sides of the machine 120, and a cab or operator station 134. The lift aim 124 is pivotably coupled to the frame 128 of the machine 120 at a pivot joint 144, and to the implement 136 by way of pivot joint 148.

Although a wheel loader is illustrated in FIGS. 1 and 2, the term "machine" may refer to any machine that performs some type of operation associated with an industry such as mining, construction, fanning, transportation, or any other industry known in the art. For example, a machine 120 may be an earth-moving machine, such as a wheel loader, excavator, dump truck, backhoe, motorgrader, material handler or the like. Similarly, although an exemplary bucket is illustrated as the attached implement 136, an alternate implement may be included. Any implements may be utilized and employed for a variety of tasks, including, for example, loading, compacting, lifting, brushing, and include, for example, buckets, compactors, forked lifting devices, brushes, grapples, cutters, shears, blades, breakers/hammers, augers, and others.

The linkage assembly 122 is coupled to the frame 128 at one end and to an implement 136 at the other. The lift arm 124 includes a pair of spaced side plates 138 secured together by a front cross-members 140, and a pivot pin cartridge 142, as will be described in greater detail below. The cross-member 140 and side plates 138 of the lift arm 124 are fixed, welded or otherwise rigidly secured together.

Figure 3:
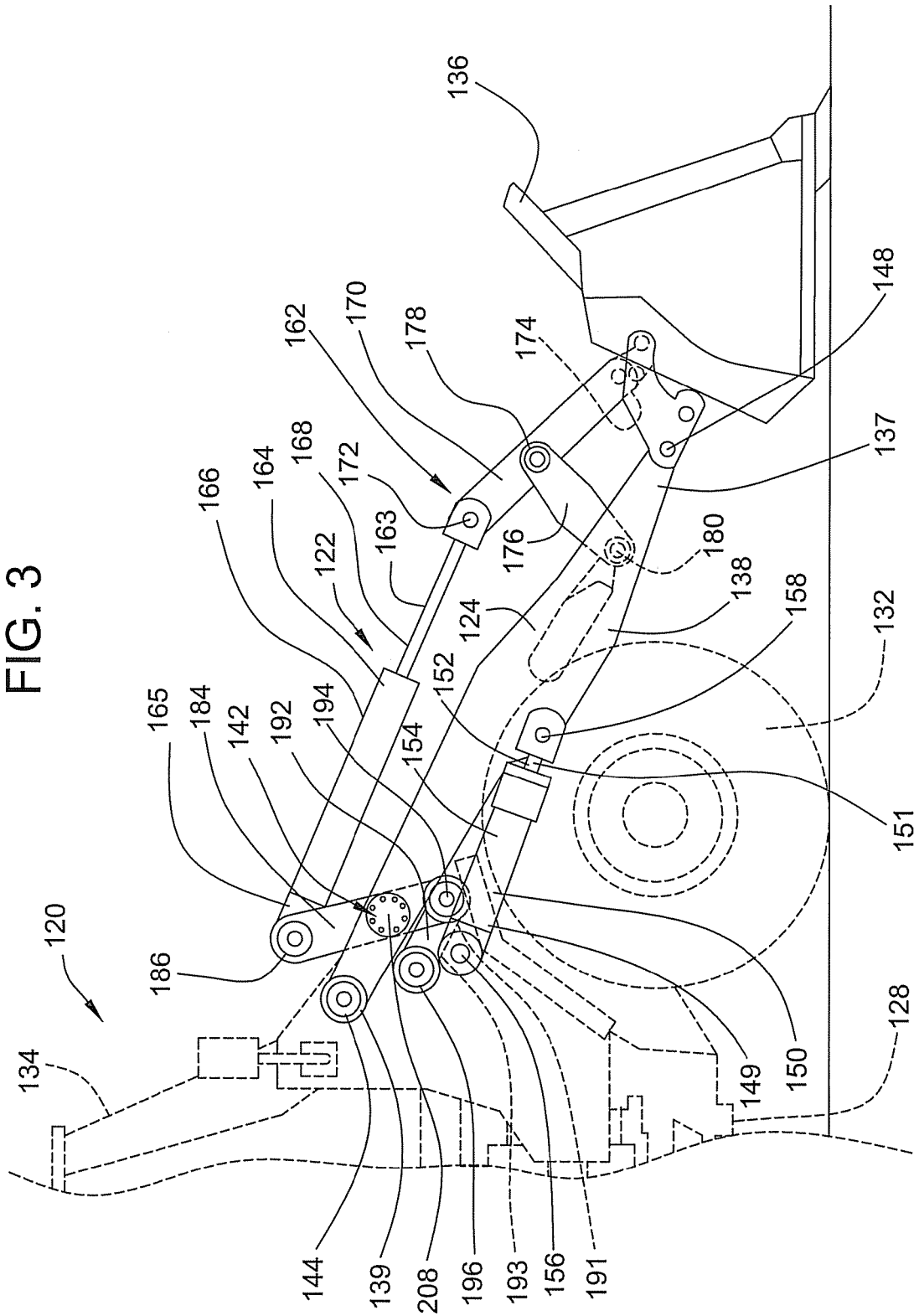
FIG. 3 is an enlarged side elevational view of the linkage assembly of FIGS. 1 and 2.
Figure 4:
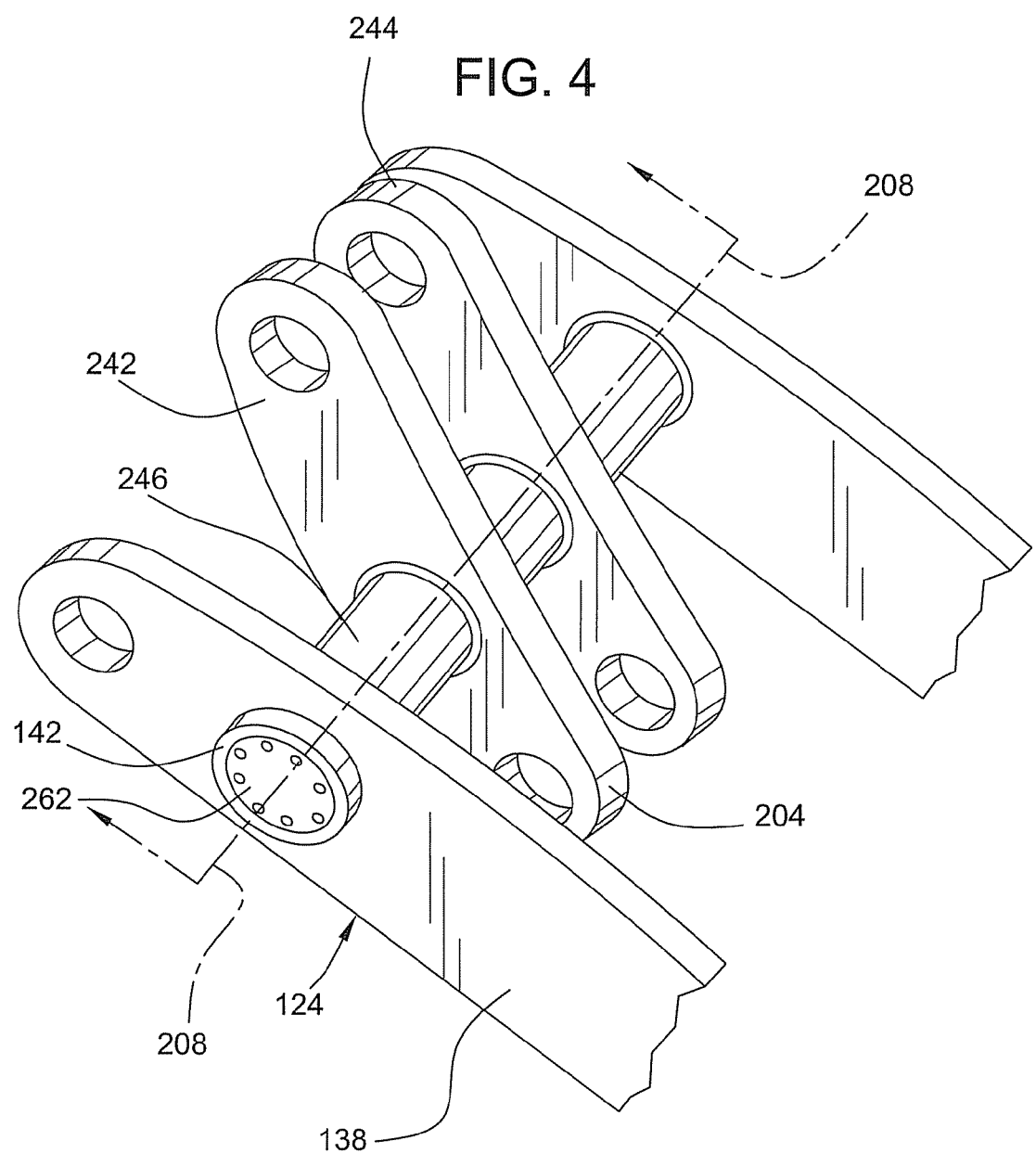
FIG. 4 is a fragmentary isometric view of the lift arm and the rear tilt lever of FIGS. 1-3.

The lift arm 124, and, therefore, the attached implement 136, are advanced between the lowered position (shown in phantom in FIG. 1) and the raised position (shown in solid lines in FIG. 1) by way of a pair of selectively actuable lift actuators 150, only one of which is fully visible in the drawings. Each of the lift actuators 150 includes a lift rod 152 that telescopes from a lift cylinder 154. Each lift actuator 150 is attached at one end to the frame 128 at respective pivot joints (see FIG. 3), and at the opposite end to an intermediate position along the length of the respective side plates 138 of the lift arm 124, again, by way of respective pivot joints 158. In this way, telescoped extension or retraction of the rods 152 from the cylinders 154 results in the raising or lowering of the lift arm 124, and the coupled implement 136.

A tilt subassembly 162 allows the operator to control the angle of the implement 136. The tilt subassembly 162 includes a tilt actuator 164, which includes a tilt cylinder 166 with a telescoping tilt rod 168. The actuation of the tilt actuator 164 tilts the implement 136 about pivot joint 148 at the implement end of the lift arm 124. One end of the tilt actuator 164 is pivotably coupled to the implement 136 by way of a front tilt lever 170. More specifically, the implement end of tilt actuator 164 is pivotably coupled to an end of the front tilt lever 170 at a pivot joint 172, the opposite end of the front tilt lever 170 being pivotably coupled to the implement 136 at a pivot joint 174.

The front lever 170 is also typically coupled to the lift arm 124 by way of a front link 176, as illustrated. One end of the front link 176 is pivotably coupled to the front tilt lever 170 at a pivot joint 178 along the length of the front lever 170. The opposite end of the front link 176 is pivotably coupled to the lift an 124 at a pivot joint 180 on ears 182 extending from the front cross-member 140 of the lift arm 124. The front link 176 provides added stability and control to the pivoting motion of the front tilt lever 170.

The tilt actuator 164 is further coupled to the frame 128 of the machine 120 by way of a rear tilt lever 184 and a rear tilt link 192. More specifically, the rear tilt lever 184 includes a link end and an actuator end. The actuator end of the rear tilt lever 184 is pivotably coupled to the tilt actuator 164 at pivot joint 186, while the opposite, link end of the rear tilt lever 184 is pivotably to a rear tilt link 192 at pivot joint 194. The opposite end of the rear tilt link 192, in turn, is pivotably coupled to the frame 128 at pivot joint 196.

The tilt subassembly 162 is also pivotably coupled to the lift arm 124 by way of the rear tilt lever 184, which is disposed between the side plates of the lift arm 124. That is, the rear tilt lever 184 is pivotably coupled to the lift aim 124 along an axis 208 such that the link and actuator ends of the rear tilt lever 184 pivot about the axis 208.

In this way, as the tilt actuator 164 is actuated, the outward telescoping of the tilt rod 168 from the tilt cylinder 166 results in a downward tilting of the implement 136 relative to the machine 120. Conversely, the inward telescoping of the components of the tilt actuator 164 results in an upward tilting of the implement 136 relative to the machine 120.

The rear tilt lever 184 is pivotably coupled to the lift arm 124 by way of a pivot pin cartridge 142, which is shown in more detail in FIGS. 4-7. For the sake of clarity, the connections to the tilt actuator 164, rear tilt link 192, and the frame 128 are not shown in the fragmentary view of FIG. 4. To pivotably couple the lift arm 124 and the rear tilt lever 184, both are mounted to the pivot pin cartridge 142 disposed along the axis 208.

Figure 5:
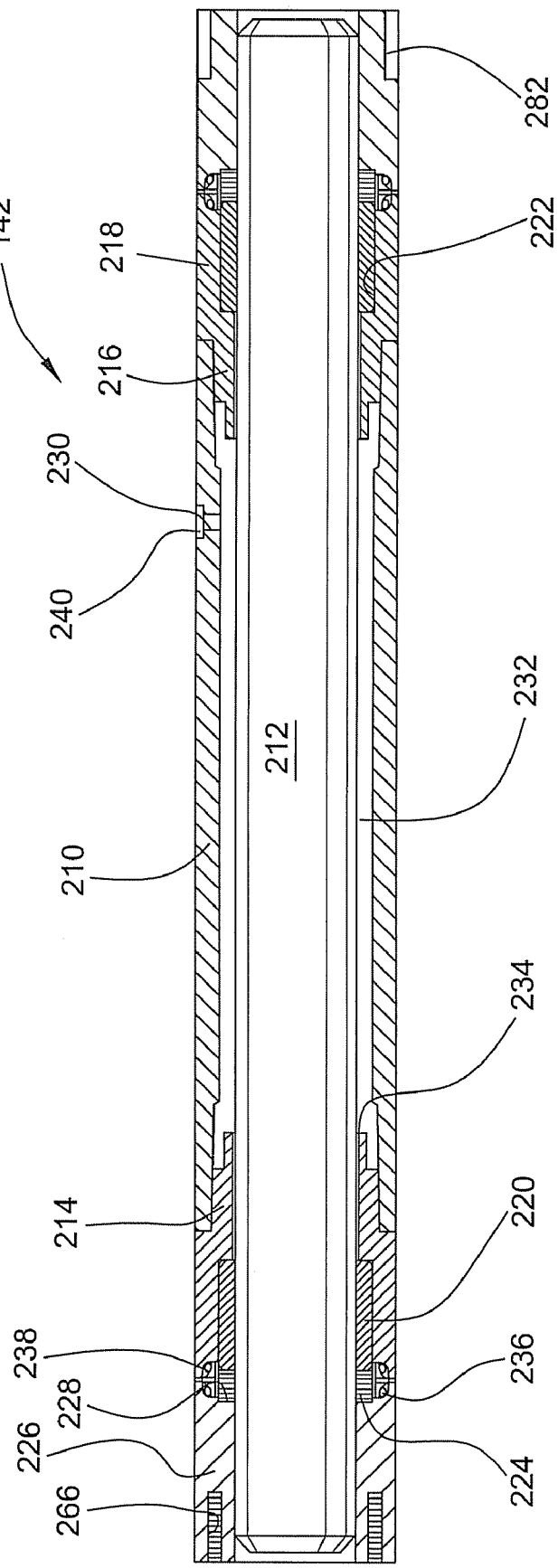
FIG. 5 is a partial cross-sectional view of a pivot pin cartridge of FIGS. 3 and 4.
Figure 6:
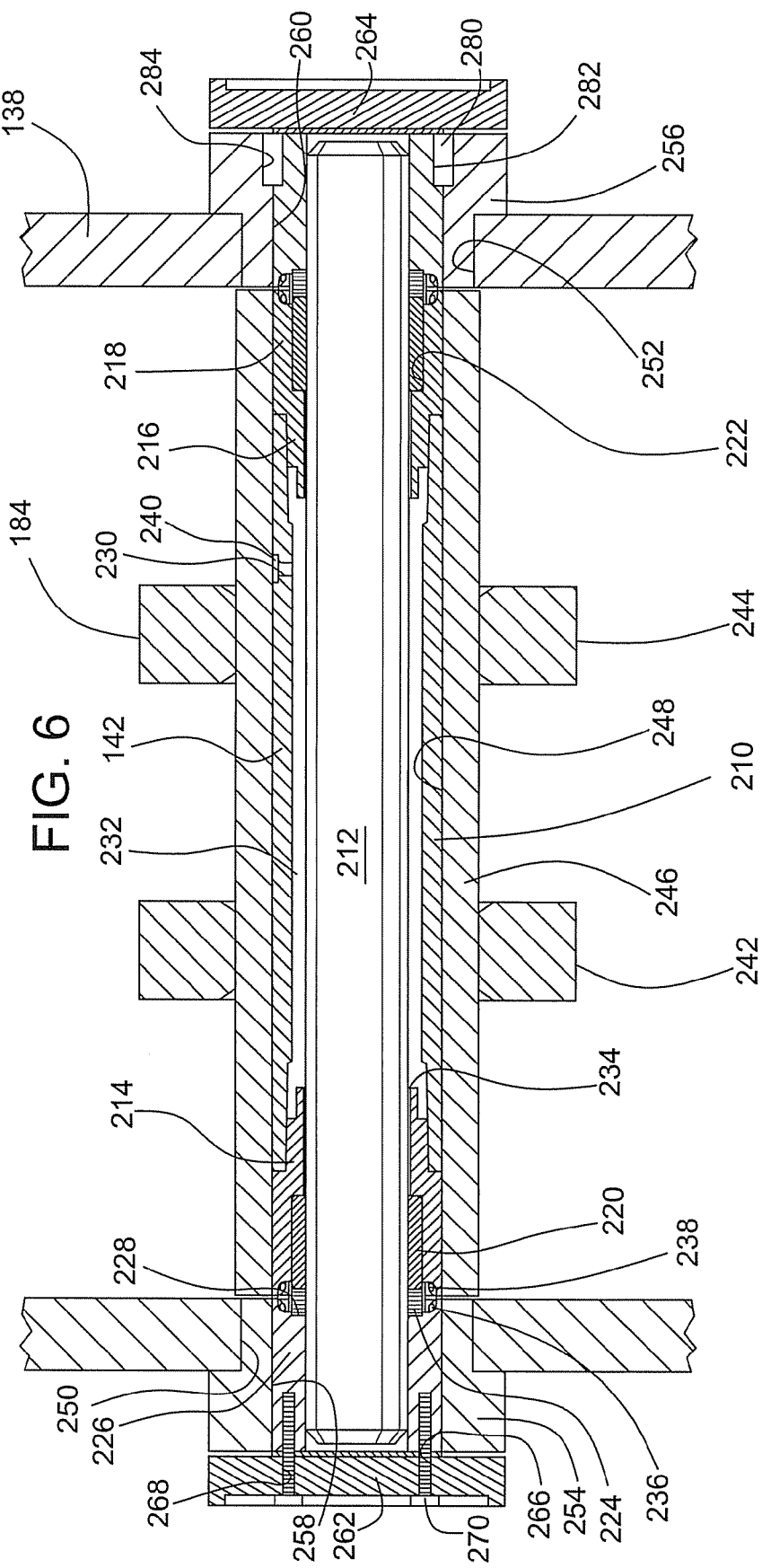
FIG. 6 is a partial cross-sectional view of the pivot pin, lift arm and rear tilt lever of FIGS. 3 and 4.
Figure 7:
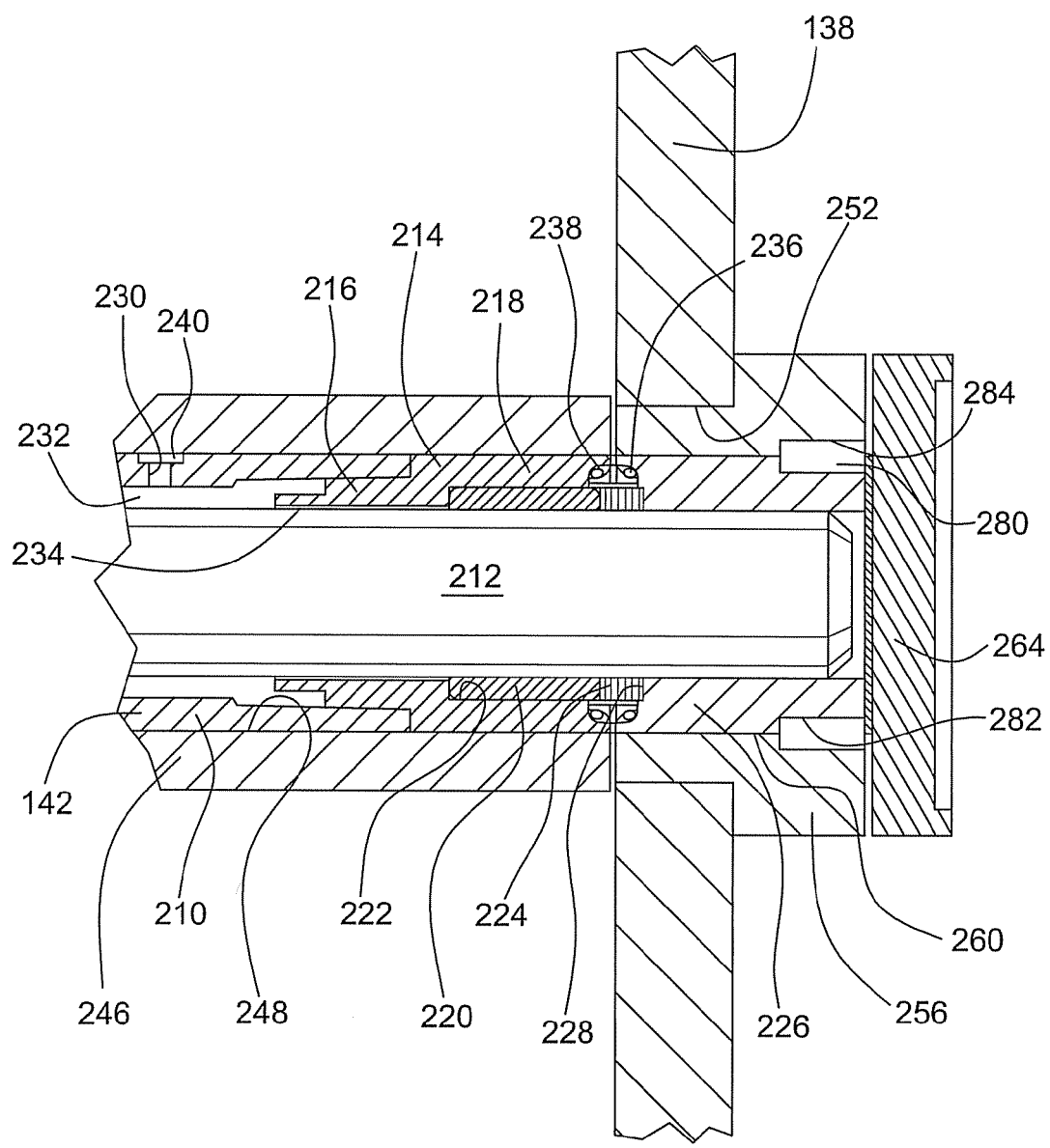
FIG. 7 is an enlarged, fragmentary, partial cross-sectional view of the lift aim and pivot pin cartridge of FIG. 6.

The pivot pin cartridge 142 itself is shown in greater schematic detail in FIGS. 5-7. The dimensions shown are provided for illustration purposes only, and the actual dimensions of the various components utilized will be dependent upon the dimensions of the components coupled thereto, and the loads applied.

Turning first to FIG. 5, the pivot pin cartridge 142 includes a sleeve or bushing 210 that is rotatably mounted on a pin 212 by hardened inserts 214. In operation, the inserts 214 and the bushing 210 act as a single unit or bushing. The bushing 210 is essentially a tubular shape, while the inserts 214 in each end are generally machined to close tolerances. The inserts 214 are formed of steel or other appropriate material, and may include a suitable corrosion and abrasion resistant coating applied thereto. The inserts 214 include circumferential flanges 216 that are disposed radially inward from the bushing 210 such that they fit within the inner diameter of the bushing 210. The inserts additionally include circumferential portions 218 that are disposed axially outward from the bushing 210, such that the portions 218 are disposed at the axial ends of the bushing 210. While the inserts 214 and bushing 210 are illustrated as separate structures, they may alternately be formed as a single structure. It will be appreciated, however, that the inclusion of the hardened inserts 214 may enhance the durability of the pivot pin cartridge 142.

To provide smooth rotation of the inserts 214 and bustling 210 about the pin 212, sleeve bearings 220 are provided. The bearings 220 are free-floating and may include a generally crown shaped surface, which provides for the direction of forces to the center of the bearing 220, minimizing edge loading. The external surfaces of the bearings 220 may be surface treated, such as by nitriding, direct hardening or the like, to produce a hard surface layer that extends at least a predetermined depth therein. Alternate disposal and number of sleeve bearings 220 may be provided.

The bearings 220 are disposed about the pin 212 in recesses 222 formed in the insert 214. The bearings 220 are further bounded by thrust bearings 224, which are disposed axially outward from the bearings 220. Collars 226 are provided at opposite ends of the pin 212, the collars 226 containing recesses 228 in which the thrust bearings 224 are disposed. The collars 226 are mounted such that they do not rotate relative to the pin 212.

Lubricating oil is provided to the bearings 220 by way of a port 230 through which oil is provided to the cavity 232 between the bushing 210 and the pin 212, and to the cavities 234 between the inserts 214 and the pin 212, and, ultimately to the cavity surrounding the bearings 220. The oil is maintained within the cavity surrounding the bearings by seals 236, 238, which may be in the form of O-rings or any other appropriate structure. Once the pin cartridge 142 has been charged with lubricating oil, the port 230 is closed by any appropriate structure the serves as a plug 240 to the port 230. For example, the plug 240 may be a threaded structure, and the port 230 a threaded bore, or the like.

The pivot pin cartridge 142 is provided as a single unit for assembly into the linkage assembly 122. The components of the pivot pin cartridge 142 may be assembled in any appropriate order. By way of example only, the bushing 210 and hardened inserts 214 may be assembled together and then to the pin 212. The bearings 220 may then be assembled into the recesses 222 in the hardened inserts 214, and the seals 236, 238 placed. Finally, the thrust bearings 224 may be preassembled into the collars 226, and the collar/thrust bearing subassemblies press fit onto either end of the pin 212. Once assembled, the pivot pin cartridge 142 may be charged with lubrication oil through the port 230 into the cavities 232, 234 and the recesses 222 about the bearings 220. The plug 240 may then be placed within the port 230 or the port 230 may be otherwise sealed. The resultant pivot pin cartridge 142 provides a complete subassembly that may be readily assembled into linkage assembly 120 during the assembly process. The manner of assembly is provided by way of example only, and the assembly order may be other than as stated.

The connection of the side plates 138 of the lift arm 124 and the rear tilt lever 184 with the pivot pin cartridge 142 is illustrated in the cross-sectional view of FIG. 6. In this embodiment, the rear tilt lever 184 includes a pair of plates 242, 244 secured to a sleeve 246 having a bore 248 therethrough for receiving the pivot pin cartridge 142. The plates 242, 244 may be formed as a single unit with the sleeve 246. Alternately, the plates 242, 244 may include bores 250, 252 which receive the sleeve 246, and the plates 242, 244 may be secured to the sleeve 246 by welding, press-fitting, or any other appropriate means. While the sleeve 246 is illustrated as an elongated structure, the sleeve 246 may have alternate dimensions. For example, the sleeve 246 may merely span the distance between the spaced plates 242, 244 of the rear tilt lever 184. In such an arrangement, spacers or bearings may be provided as separate pieces, axially disposed on either side of the sleeve 246.

The side plates 138 of the lift arm 124 similarly are each fit with a collar 254, 256. Each collar 254, 256 includes a bore 258, 260 therethrough for receiving the pivot pin cartridge 142. The side plates 138 and the collars 254, 256 may likewise be formed as respective unitary structures or the side plates 138 and collars 254, 256 may be secured together by welding, press-fitting, or other appropriate means.

In assembly, the pivot pin cartridge 142 is assembled through the bore 260 of a first of the side plates 138, the bore 248 extending through the rear tilt lever sleeve 246, and the bore 258 of the second side plate 138. Once placed, in order to prevent relative motion between the pivot pin cartridge 142 and a side plate 138 of the lift arm 124, dowels 280 are disposed within semicircular notches 282, 284 in the collar 226 at one end of the cartridge 142 and the collar 256 of the side plate 138, respectively. The number of dowels 280 so positioned will generally be dependent upon the associated forces developed. In the illustrated embodiment, four dowels are utilized, although an alternate number of dowels 280 may be utilized.

To retain the dowels 280 in position, a retainer 264 is coupled to the end of the pivot pin cartridge 142 by any appropriate mechanism. In the illustrated embodiment, such retainers 262, 264 are provided at both ends of the pivot pin cartridge 142. To couple the retainers 262, 264, the collars 226 of the pivot pin cartridge 142 include threaded recesses 266 and the retainers 262, 264 include bores 268 for receiving threaded fasteners 270. While eight such threaded fasteners 270 are illustrated, as with the dowels 280, any appropriate number of treaded fasteners 270 may be provided.

INDUSTRIAL APPLICABILITY

The disclosed embodiment provides the openness of a lift arm 138 of a plate design, without the bulky structure of having two sets of tilt assembly components. Inasmuch as the pivot pin cartridge 142 is relatively compact, utilization of the pivot pin cartridge 142 in connecting the side plates 138 and the rear tilt lever 184 may eliminate the need for a bulky welded rear cross-member when utilizing a single tilt assembly as opposed to the two sets of tilt components. In this way, the use of the pivot pin cartridge 142 may provide enhanced visibility to an operator of the machine 120 over traditional connection arrangements. Such enhanced visibility may be particularly apparent when the linkage assembly 122 is in the raised position wherein a bulky, welded rear cross-member may significantly obscure the operator's visibility both in front of the machine 120 and to either side of the linkage assembly 122. Thus, the inclusion of the pivot pin cartridge 142 as opposed to a bulky cross-member may not only enhance the efficient operation of the machine 120, but also safety during operation.

The linkage assembly 120 including the pivot pin cartridge 142 may be advantageous from a manufacturing standpoint and in ultimate operation of the machine 120. The pivot pin cartridge 142 provides a stable connection of the side plates 138, eliminating the costs associated with welding an additional stiff cross-member including a bearing between the side plates 138. The pivot pin cartridge 142 may allow the disclosed linkage assembly 122 to be readily manufactured. The pivot pin cartridge 142 is pre-assembled and pre-lubricated and provided as a self-contained subassembly that may be pulled and/or pressed into the side plates 138 of the lift arm 124 and the rear tilt lever 184. To facilitate assembly into the plates 138 and rear tilt lever 184, the overall outer diameter of the pivot pin cartridge 142 may increase slightly from one end to the other such that the smaller diameter end may be fed first into the bores 248, 258, 260 of the rear tilt lever 184 and the side plates 138. The internal components of the pivot pin cartridge 142 may similarly increase in diameter from one end to the other, allowing the internal components of the pivot pin cartridge 142 to be readily preassembled prior to placement of the cartridge 142 into the linkage assembly 122.

Because the pivot pin cartridge 142 is prelubricated and self-contained, the inclusion of the assembly may significantly reduce or even eliminate daily lubrication requirements. The cartridge 142 is charged with lubricating oil through the port 230 and flows into the cavities 232, 234 between the bushing 210 and pin 212 and between the inserts 214 and pin 212, and about the sleeve bearings 220. During usage, the seals 236, 238 inhibit the leakage of oil from the cartridge 142.

It will be appreciated that the foregoing description provides examples of the disclosed system and techniques. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A linkage assembly for connecting an implement to a frame of a machine, the linkage assembly comprising:
   a lift arm including a machine end adapted to be pivotally coupled to the frame and an implement end adapted to be pivotably coupled to the implement, the lift arm including a pair of side plates, the side plates being separate and generally spaced apart in a parallel relationship, the side plates each having a bore therethrough,
   a lever disposed intermediate the side plates, the lever having opposite ends adapted to be pivotably coupled to the frame and to the implement, the lever further having a bore therethrough, the bore being disposed intermediate the opposite ends of the lever,
   a pivot pin cartridge defining an axis, the pivot pin cartridge including a pin disposed along said axis and having opposite ends,
      at least one bushing pivotably disposed about at least a portion of said pin, and
      at least two sleeve bearings disposed about said pin and within at least a portion of said bushing,
      first and second collars disposed about opposite ends of the pin,
   the pivot pin cartridge extending through the bore of the lever and through the bores of said plates, said lift arm and said lever being relatively pivotable about said axis, the lever being coupled to the bushing for rotation therewith about the pin.

2. The linkage assembly of claim 1 wherein the at least two sleeve bearings are free floatingly positioned between the pin and the bushing.

3. The linkage assembly of claim 2 wherein the bearing includes a crown-shaped surface disposed to contact the bushing.

4. The linkage assembly of claim 1 further comprising
   a rear tilt link having a lever end and a machine end, the machine end adapted to be pivotably coupled to the frame,
   a tilt actuator having a lever end and an implement end, the implement end adapted to be pivotably coupled to the implement, and
   the opposite ends of the lever including a link end pivotably coupled to the lever end of the rear tilt link, and an actuator end pivotably coupled to the lever end of the tilt actuator.

5. The linkage assembly of claim 4 further comprising a front tilt lever, and a front tilt link, the front tilt lever being pivotably coupled to the implement end of the tilt actuator and to the implement, the front tilt link being pivotably coupled to the front tilt lever and the side plates.

6. The linkage assembly of claim 5 further comprising a front cross-member, the cross-member being coupled to each of the side plates, the front tilt link being pivotably coupled to the cross-member to couple the front tilt link to the side plates.

7. The linkage assembly of claim 1 wherein the bushing comprises at least one insert.

8. The linkage assembly of claim 1 wherein the lift arms are separated a distance, and the bushing extends substantially the entire distance.

9. The linkage assembly of claim 1 wherein the lever is nonrotatably coupled to the bushing, and at least one of the side plates is nonrotatably coupled to at least one of the first and second collars—, respectively.

10. A method of coupling an implement to a frame of a machine, the method comprising the steps of:
pivotably coupling machine ends of respective side plates of a lift arm to the frame, the side plates being separate and spaced apart in a substantially parallel relationship,
pivotably coupling implement ends of the respective side plates of the lift arm to the implement,
disposing a rear tilt lever intermediate the side plates,
pivotably coupling a tilt actuator end of a rear tilt lever to the implement,
pivotably coupling a link end of the rear tilt lever to the frame,
coupling the rear tilt lever to the side plates for relative pivotable movement along an axis, the rear tilt lever being relatively pivotably coupled at a bore located intermediate said tilt actuator and lever ends, and the side plates being relatively pivotably coupled at bores intermediate said machine and implement ends, the step of pivotably coupling the rear tilt lever to the side plates including the steps of
providing a pivot pin,
rotatably disposing a bushing on said pivot pin,
disposing at least two sleeve bearings about said pivot pin and within at least a portion of said bushing to form a pivot pin cartridge,
securing the bores of the side plates to opposite ends of the pivot pin,
securing the bores of the rear tilt lever to said at least one bushing.

11. The method of claim 10 wherein the step of coupling the rear tilt lever to the side plates further comprises the step of securing the bores of the side plates to respective collars, securing the ends of the pivot pin to respective pin collars, and securing at least one of the collars of the side plates to at least one of the respective pin collars.

12. The method of claim 10 further comprising the step of pivotably coupling a pair of lift actuators to the frame and to the side plates, respectively, and the step of pivotably coupling the link end of the rear tilt lever to the frame comprises the step of coupling opposite ends of a rear tilt link to the frame and to the link end of the rear tilt lever, and the step of coupling the tilt actuator end of the rear tilt lever to the implement comprises the steps of coupling the actuator end of the rear tilt lever to a lever end of a tilt actuator, coupling an implement end of the tilt actuator to a machine end of a front tilt lever, and coupling an implement end of the front tilt lever to the implement.

13. A machine to which an implement may be connected comprising:
a frame,
a linkage assembly including
a lift arm including a machine end pivotably coupled to the frame and an implement end adapted to be pivotably coupled to the implement, the lift arm including a pair of side plates, said side plates being separate and spaced apart in a substantially parallel relationship, the side plates each having a bore therethrough,
a rear tilt lever having opposite ends adapted to be pivotably coupled to the frame and the implement, respectively, the rear tilt lever further including a bore therethrough intermediate the opposite ends,
a pivot pin cartridge defining an axis, the pivot pin cartridge including a pin disposed along said axis and having opposite ends,
at least one bushing pivotably disposed about at least a portion of said pin, and
at least two sleeve bearings disposed about said pin and within at least a portion of said bushing,
first and second collars disposed about opposite ends of the pin,
the pivot pin cartridge extending through the bore of the lever and through the bores of said plates, said lift arm and said rear tilt lever being relatively pivotable about said axis, the rear tilt lever assembly being coupled to the bushing for rotation therewith about the pin.

14. The machine of claim 13 wherein the at least two sleeve bearings are free floatingly positioned between the pin and the bushing.

15. The machine of claim 13 wherein at least one of the bearings includes a crown-shaped surface disposed to contact the bushing.

16. The machine of claim 14 wherein the bearing includes a crown-shaped surface disposed to contact the bushing.

17. The machine of claim 13 wherein at least one of said side plates is coupled to at least one of the first and second collars.

18. The machine of claim 13 further comprising
a rear tilt link having a lever end and a machine end, the machine end being pivotably coupled to the frame,
a tilt actuator having a lever end and an implement end, the implement end being pivotably coupled to the implement, and
the rear tilt lever including a link end pivotably coupled to the lever end of the rear tilt link, and an actuator end pivotably coupled to the lever end of the tilt actuator.

19. The machine of claim 13 further comprising at least one lift actuator having a machine end pivotably coupled to the frame and an arm end being pivotably coupled to the lift arm.

20. The machine of claim 13 the side plates each including a collar, at least one of the side plate collars being coupled to at least one of the cartridge collars.

* * * * *